July 12, 1960   A. FEIST ET AL   2,944,290
CURING BAGS FOR REPAIRING TIRES
Original Filed June 8, 1956
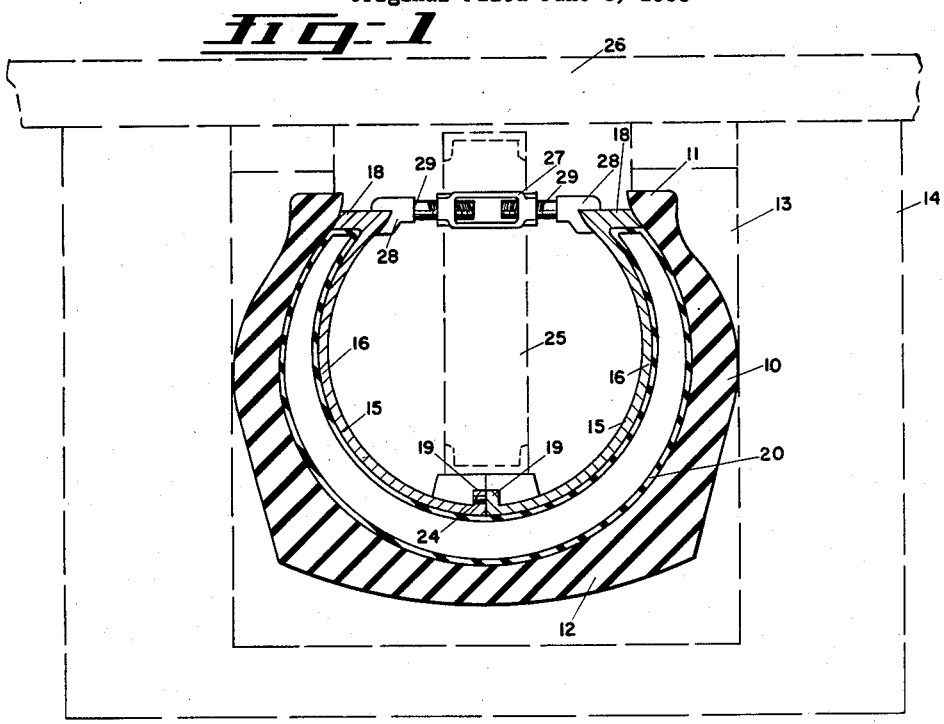
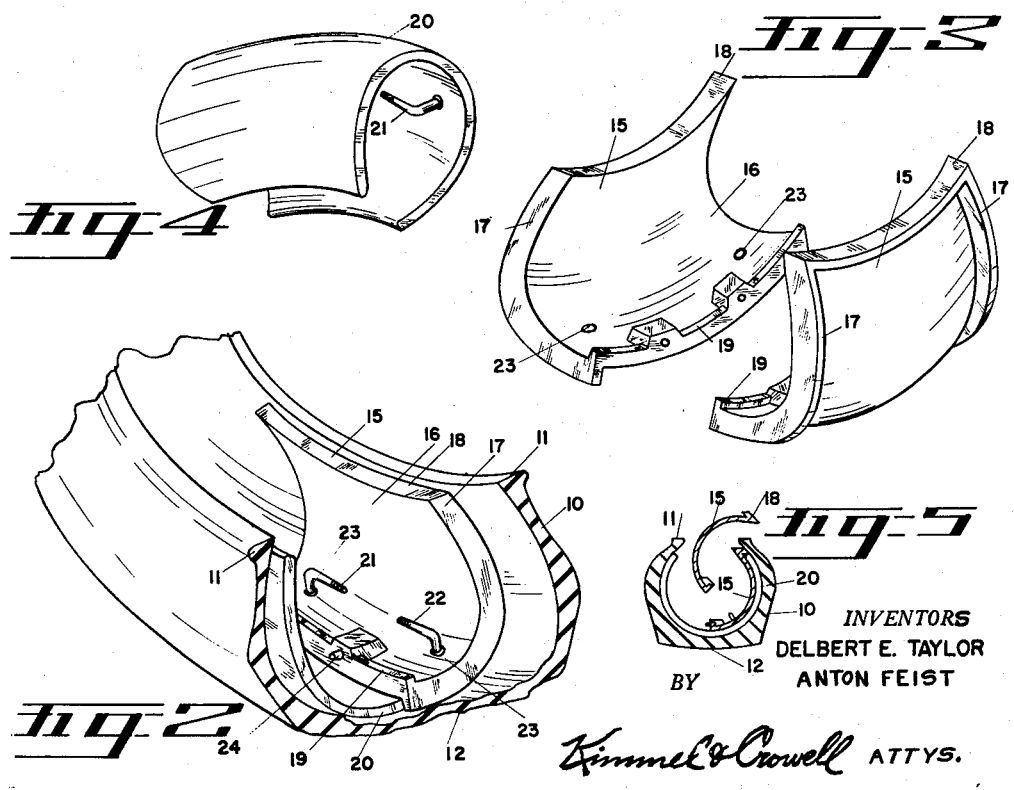
INVENTORS
DELBERT E. TAYLOR
ANTON FEIST
BY
Kimmel & Crowell ATTYS.

United States Patent Office 2,944,290
Patented July 12, 1960

2,944,290

CURING BAGS FOR REPAIRING TIRES

Anton Feist, Yakima, Wash., and Delbert E. Taylor, Portland, Oreg., assignors, by mesne assignments, to United States Rubber Company, New York, N.Y., a corporation of New Jersey Continuation of application Serial No. 590,281, June 8, 1956. This application Oct. 3, 1958, Ser. No. 765,193

4 Claims. (Cl. 18—45)

The present invention relates to curing bags for repairing tire casings and more particularly to such devices which are adapted for the curing of repairs within tires of the type having large cross sectional area and relatively small rim or bead diameters.

The primary object of the invention is to provide a curing bag that can be collapsed for placing the same into the tire or removing the same from the tire.

Another object of the invention is to provide a curing bag that can be placed within the tire in repair work such that it will not displace the repair materials by having to spread the beads of the tire too far apart, as in the case of present day one piece curing bags.

Our new and improved curing bag can be collapsed and disassembled while placing the same into the tire or removing the same therefrom.

Other objects and advantages will become apparent in the following specification when considered in the light of the attached drawings, in which:

Figure 1 is a fragmentary transverse section through the tire, including the curing bag assembly, the outside curing mold being illustrated by broken lines.

Figure 2 is a fragmentary perspective of the tire, illustrating the curing bag assembly partially installed within the tire shown partially broken away and in section for clarity.

Figure 3 is a perspective exploded view of the frame structure of the curing bag before being installed and with the bag proper removed therefrom.

Figure 4 is a perspective view of the bag.

Figure 5 is a diagrammatical sectional view of the tire illustrating how the framework of the bag is installed within the tire after the bag has been installed within the tire.

Referring now to the drawings in detail wherein like reference numerals indicate like parts throughout the several figures, the reference numeral 10 indicates a tire to be repaired. The tire 10 has the usual beads 11 and the tread 12. In these drawings, we have only illustrated the tire by a sectional view, covering both the fabric and rubber part of the casing, eliminating the detail of structure or the repair being placed in the tire for convenience of illustration. The broken lines 13 and 14 illustrate the position of the mold in which the tire casing is being repaired, and has nothing to do with the present invention, as various types of molds are used.

The invention consists of a pair of rigid frame members 15 shaped to conform to the inner shape of the tire casing 10. The frame members 15 have relatively thin walls 16, bordered by end flanges 17 and outwardly extending flanges 18. Inwardly extending flanges 19 are formed on the opposite edge of the frame members 15.

The space between the flanges 17 and 18 is adapted to receive a flexible bag 20. The bag 20 is adapted to be inflated by steam, air or other curing medium. Valves 21 and 22 admit the gaseous material to the bag 20. The valves 21 and 22 pass through the openings 23 of one of the frame members 15.

Dowel pins 24 are provided in one of the flanges 19 for aligning the frame members 15 within the tire 10. The frame members 15 and the bag 20 are held within the tire 10 by the bracing 25 indicated by broken lines and engaging the underside of a cross member 26, forming part of the outer mold structure 14.

The expansion turnbuckles 27 have bifurcated ends 28 formed on the threaded bolts 29 and are adapted to expand the space within the frame members 15 to fit the inner contour of the tire 10, and to take the compression pressure which will be exerted by the bag 20 while steam or other curing medium is being circulated in and out of the bag 20. One of the turnbuckles 27 may be located adjacent each end of the curing bag assembly.

We will now describe how our new and improved curing bag is applied to a casing of a tire 10 to be repaired. Referring to Figures 2 and 5, the bag 20 is brought into place as indicated in these figures within the tire 10. Next, one of the frames 15 is set into the tire 10 straddling the bag 20, after which the oppositely disposed frame member 15 is dropped in, as best illustrated in Figure 5, and brought into position as shown in Figure 1. The bag 20 is then inflated by steam or other curing medium used for this purpose through the valve 21. In case of steam being used, the steam can enter one end of the bag 20 and leave its opposite end, maintaining the bag 20 and casing 10 at the proper temperature for vulcanizing the repair being made.

Having thus described the preferred embodiment of the invention, it should be understood that numerous modifications and structural adaptations may be resorted to without departing from the scope of the appended claims.

This application is a continuation of our application Serial No. 590,281, filed June 8, 1956.

Having thus described our invention, what we claim and desire to protect by Letters Patent is:

1. A curing bag assembly for tire repairing comprising a pair of longitudinally curved foundation members having a semi-cylindrical cross section, said foundation members normally having their lower edges in abutting relation, interengaging means formed on said lower abutting edges of said foundation members for holding said edges of said members in alignment, outwardly extending flanges formed on the other peripheral edges of said foundation members, adjustable means extending between the upper edges of said foundation members for maintaining said upper edges in spaced aligned relation, a curing bag overlying said foundation members between said outwardly extending flanges, and means for circulating a curing medium through said bag, whereby the bag and tire may be maintained at a proper temperature during the vulcanization of the repair.

2. A device as claimed in claim 1 wherein the adjustable means for maintaining said opposite edges in spaced aligned relation comprise turnbuckles positioned between said edges and in engagement therewith.

3. A curing bag assembly for tire repairing comprising a pair of thin-walled longitudinally curved foundation members having a semi-cylindrical cross section, said foundation members normally having their lower edges in abutting relation, upstanding flanges integrally formed on said lower abutting edges of said foundation members, outwardly extending flanges integrally formed in the other peripheral edges of said foundation members, a pair of expansion turnbuckles each having bifurcated ends, said turnbuckles extending between the upper edges of said foundation members for maintaining said upper edges in spaced aligned relation, means for bracing said assembly within said tire, a relatively thin arcuate curing bag overlying said foundation members between said outwardly extending flanges, and means for circulating a curing medium through said bag, whereby the bag and tire may be maintained at a proper temperature during the vulcanization of the repair.

4. A curing bag assembly for tire repairing comprising a pair of thin walled longitudinally curved foundation members having a semi-cylindrical cross section, one of said foundation members having a pair of apertures extending therethrough, said foundation members normally having their lower edges in abutting relation, upstanding flanges integrally formed on said lower abutting edges of said foundation members, outwardly extending flanges integrally formed on the other peripheral edges of said foundation members, a pair of expansion turnbuckles each having bifurcated ends, said turnbuckles extending between the upper edges of said foundation members maintaining said upper edges in spaced aligned relation, means bracing said assembly within said tire, a relatively thin arcuate curing bag overlying said foundation members between said outwardly extending flanges, a pair of valve members mounted on said bag, said valve members extending through said apertures whereby said valve members may be connected to supply and discharge lines for circulating a curing medium through said bag.

References Cited in the file of this patent

UNITED STATES PATENTS

| | | |
|---|---|---|
| 1,162,535 | Willey | Nov. 30, 1915 |
| 1,417,701 | Trump | May 30, 1922 |